(12) United States Patent
Nemedi (10) Patent No.: US 7,021,455 B2
(45) Date of Patent: Apr. 4, 2006

(54) WET CHIP PICK-UP ASSEMBLY

(75) Inventor: William D. Nemedi, Paw Paw, MI (US)

(73) Assignee: Inter-Source Recovery Systems, Inc., Kalamazoo, MI (US)

( * ) Notice: Subject to any disclaimer, the term of this patent is extended or adjusted under 35 U.S.C. 154(b) by 106 days.

(21) Appl. No.: 10/823,943

(22) Filed: Apr. 14, 2004

(65) Prior Publication Data

US 2005/0230226 A1  Oct. 20, 2005

(51) Int. Cl.
*F26B 13/30* (2006.01)

(52) U.S. Cl. ............................ 198/781.01; 198/781.02; 198/867.13

(58) Field of Classification Search ........... 198/781.01, 198/781.02, 789, 498, 867.01, 867.13; 210/386; 56/310, 364
See application file for complete search history.

(56) References Cited

U.S. PATENT DOCUMENTS

| | | | | |
|---|---|---|---|---|
| 2,748,663 A | * | 6/1956 | Kean | 409/69 |
| 3,216,042 A | * | 11/1965 | Werner | 15/246.5 |
| 3,987,612 A | * | 10/1976 | Bobkowicz | 57/5 |
| 4,186,096 A | * | 1/1980 | Areaux et al. | 210/377 |
| 4,217,672 A | * | 8/1980 | Olivari | 15/79.2 |
| 4,235,382 A | * | 11/1980 | Smith | 241/28 |
| 4,297,760 A | * | 11/1981 | Olivari | 15/79.1 |
| 4,298,476 A | * | 11/1981 | Dudley | 210/373 |
| 4,539,801 A | * | 9/1985 | Field | 56/364 |
| 4,597,252 A | * | 7/1986 | Williames | 56/130 |
| 4,936,822 A | | 6/1990 | Nemedi | 494/43 |
| 5,106,487 A | | 4/1992 | Nemedi | 209/12 |
| 5,109,976 A | * | 5/1992 | Mohri et al. | 198/498 |
| 5,252,208 A | | 10/1993 | Nemedi | 210/373 |
| 5,264,124 A | | 11/1993 | Nemedi | 210/380.1 |
| 5,275,727 A | | 1/1994 | Nemedi | 210/373 |
| 5,330,637 A | | 7/1994 | Nemedi | 210/232 |
| 5,345,665 A | | 9/1994 | Nemedi | 29/402.15 |
| 5,383,941 A | | 1/1995 | Nemedi | 29/402.08 |
| RE35,307 E | | 7/1996 | Nemedi | 494/43 |
| 5,720,877 A | * | 2/1998 | Dudley | 210/232 |
| 5,944,992 A | | 8/1999 | Nemedi et al. | 210/373 |
| 6,129,851 A | | 10/2000 | Nemedi et al. | 210/781 |
| 6,253,929 B1 | | 7/2001 | Nemedi et al. | 210/373 |
| 6,296,125 B1 | * | 10/2001 | Dudley | 210/373 |
| 6,375,841 B1 | | 4/2002 | Nemedi et al. | 210/298 |
| 6,405,877 B1 | | 6/2002 | Nemedi et al. | 210/498 |
| 6,540,087 B1 | | 4/2003 | Nemedi et al. | 209/146 |
| 6,572,779 B1 | | 6/2003 | Nemedi et al. | 210/787 |
| 2003/0178518 A1 | | 9/2003 | Nemedi | 241/243 |

* cited by examiner

*Primary Examiner*—Douglas Hess
(74) *Attorney, Agent, or Firm*—Marshall, Gerstein & Borun LLP (57) ABSTRACT

A wet chip pick-up assembly includes a slotted rotary drum. A comb member is seated for movement in each of the drum slots. A friction drive assembly frictionally engages the drum causing the drum to rotate which, in turn, causes the comb members to rotate.

20 Claims, 7 Drawing Sheets

WET CHIP PICK-UP ASSEMBLY

This disclosure relates generally to a wet chip pick-up assembly utilized with a shredder assembly, and, more particularly, to a wet chip pick-up assembly having an improved drive assembly.

BACKGROUND

Often following a machining operation or the like, wet chips generated in the course of the machining operation are transported to a shredder assembly where the wet chips are shredded. Thereafter, the shredded wet chips are transported to a centrifugal separator apparatus, shown, for example, in Nemedi U.S. Pat. No. 5,264,124, where the wet chips are centrifuged and separated into dry chips and fluid.

In some instances, wet chips are delivered to a shredder assembly by a wet chip pick-up assembly generally located in a flume. As used herein, a flume is a wet chip fluid transport wherein wet chips to be separated travel in a trough having a fluid therein which serves to transport the wet chips from one or more wet chip collection stations to a shredder assembly station. The wet chips to be separated are first delivered to the wet chip pick-up assembly prior to the wet chips entering the shredder assembly. The wet chip pick-up assembly employs a plurality of spaced combs that slide in and out of a plurality of spaced slots in a rotating drum. The combs are attached to a rotating drive shaft having a longitudinal axis. A drive assembly, which utilizes a mechanical gear- or sprocket-type drive assembly, rotates the drive shaft.

The slotted drum is mounted for rotation by the combs. Upon actuation of the comb drive shaft, the combs contact the drum at the location of the drum slots, thereby causing the drum to rotate. The longitudinal axis of the comb drive shaft is offset from the longitudinal axis of the drum. During a portion of a 360° rotation, the combs will protrude substantially outward from the drum when the combs are in the flume, following which the combs retreat inwardly into the drum as the drum and combs continue to rotate about their respective longitudinal axes.

It has been found that a problem exists with this type of wet chip pick-up assembly. Specifically, it has been found that as the comb drive shaft and combs initially rotate, the combs wear against, or otherwise adversely contact, the drum at the location of the drum slots. Once the combs have caused the drum to commence rotating, the wear problem, which is sometimes reflected by a loud chattering noise at the location of a drum slot and comb, appears to subside. Over a period of time, however, there is concern that the undesired wearing will occasion either a premature machine component replacement or a malfunction of the wet chip pick-up assembly.

An effort has been made to obviate the chatter and wear problem by utilizing a wet chip pick-up assembly where the slotted drum is driven by the drive assembly. Upon rotation of the slotted drum, contact is made with the combs, causing the combs to rotate. Unfortunately, this particular wet chip pick-up assembly has not been entirely satisfactory in obviating the wear and chatter problems.

Further, wet chip pick-up assemblies presently available are too bulky for some applications.

What is desired is to have a wet chip pick-up assembly that can be employed in a flume wherein the combs travel in the drum slots without substantial adverse wear of either the combs or the drum at the location of the drum slots.

Moreover, it is desired to obviate the loud noise that sometimes occurs at the location of a comb and drum slot in wet chip pick-up assembly presently available.

Finally, it is desired to minimize the size of a wet chip pick-up assembly in order that the assembly can readily be employed in a flume.

SUMMARY

The present disclosure is directed to a wet chip pick-up assembly which serves to minimize the above-referenced problems that exist with wet chip pick-up assembly presently available and to achieve the above-referenced desires. The wet chip pick-up assembly disclosed herein comprises a relatively compact assembly that utilizes a friction-type drive assembly that causes the slotted drum to rotate which, in turn, rotates the combs.

Briefly, rotatable friction disc assemblies mounted on a drive shaft rotate against the ends of a slotted drum causing the drum to rotate about its longitudinal axis. A plurality of spaced combs is attached to a plurality of spaced comb plates fixed to a collar. The collar seats on, but does not rotate with, the friction disc assembly drive shaft. The longitudinal axis of the friction disc assembly drive shaft is offset from the longitudinal axis of the drum.

The combs are positioned so that a comb will extend through a drum slot, each comb being adapted to move inwardly and outwardly relative to the drum as the drum rotates 360°.

It has been found that by utilizing a friction drive to rotate the drum, which, in turn, causes the combs to rotate, the above-mentioned adverse wear and noise problems are substantially minimized. Moreover, the overall assembly is a relatively compact assembly that permits it to be employed in a flume.

These and other features, advantages and objects will be further understood and appreciated by those skilled in the art by reference to the following specification, drawings and claims.

DETAILED DESCRIPTION OF THE EMBODIMENTS

Figure 1:
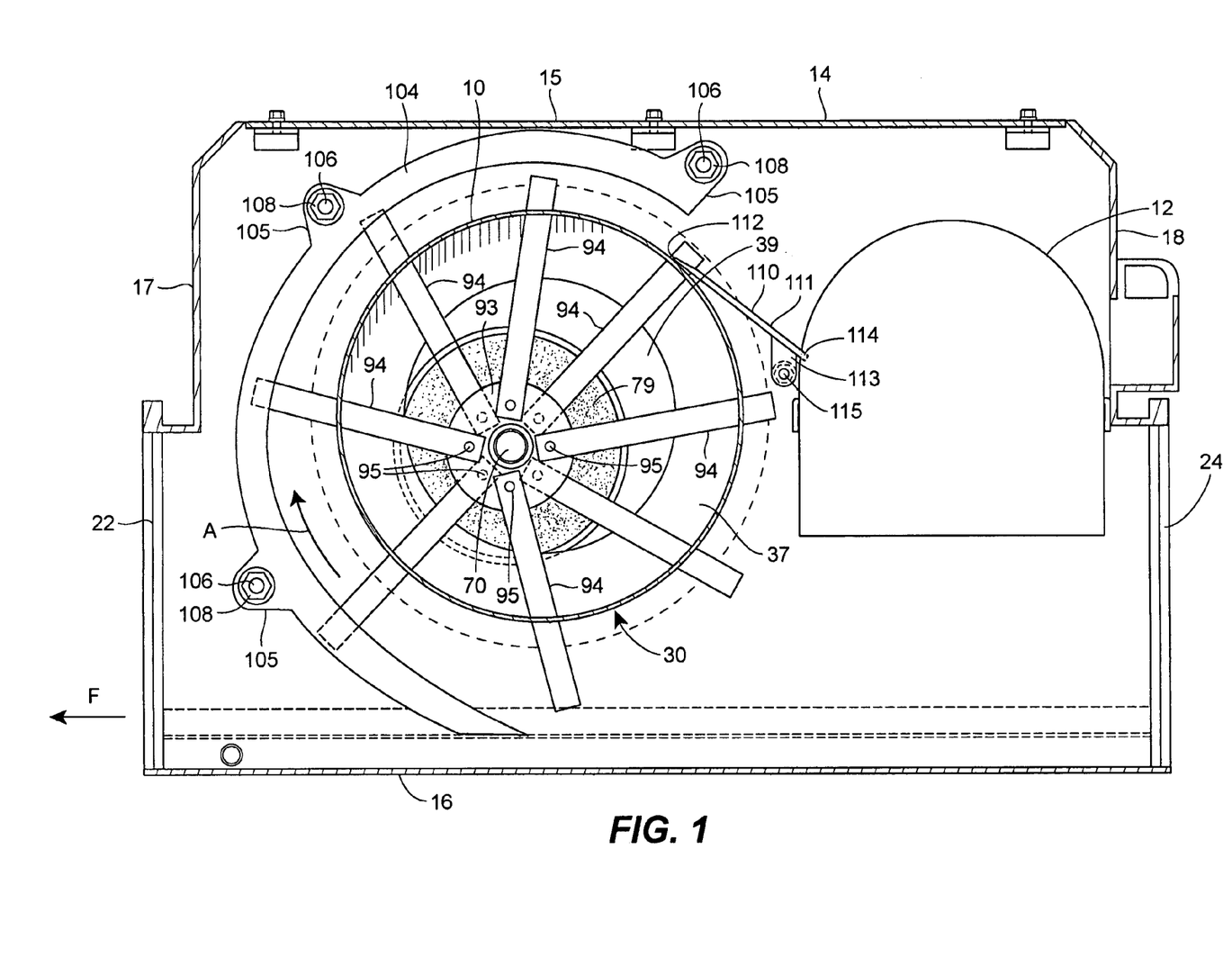
FIG. 1 shows a side section view of a wet chip pick-up assembly of the present disclosure and a conventional shredder assembly.

Referring to the drawings, FIG. 1 shows a wet chip pick-up assembly 10 positioned adjacent to a conventional shredder assembly 12. The pick-up assembly 10 and shredder assembly 12 are shown disposed within a frame assembly 14 having a top wall 15, base 16, spaced end walls 17, 18 and spaced side walls 21 (FIGS. 2–4, 6).

The frame assembly 14 in this particular embodiment is adapted to be inserted into or made a part of a flume, whereby wet chip material (i.e., wet chips and other materials, for example, debris such as bolts, etc.) travels in the flume and enter into frame assembly 14 at opening 24 in end wall 18. Following the travel of the wet chip material through wet chip pick-up assembly 10 and shredder assembly 12, shredded wet chips exit out of frame assembly 14 through opening 22 in the remaining end wall 17.

Figure 4:
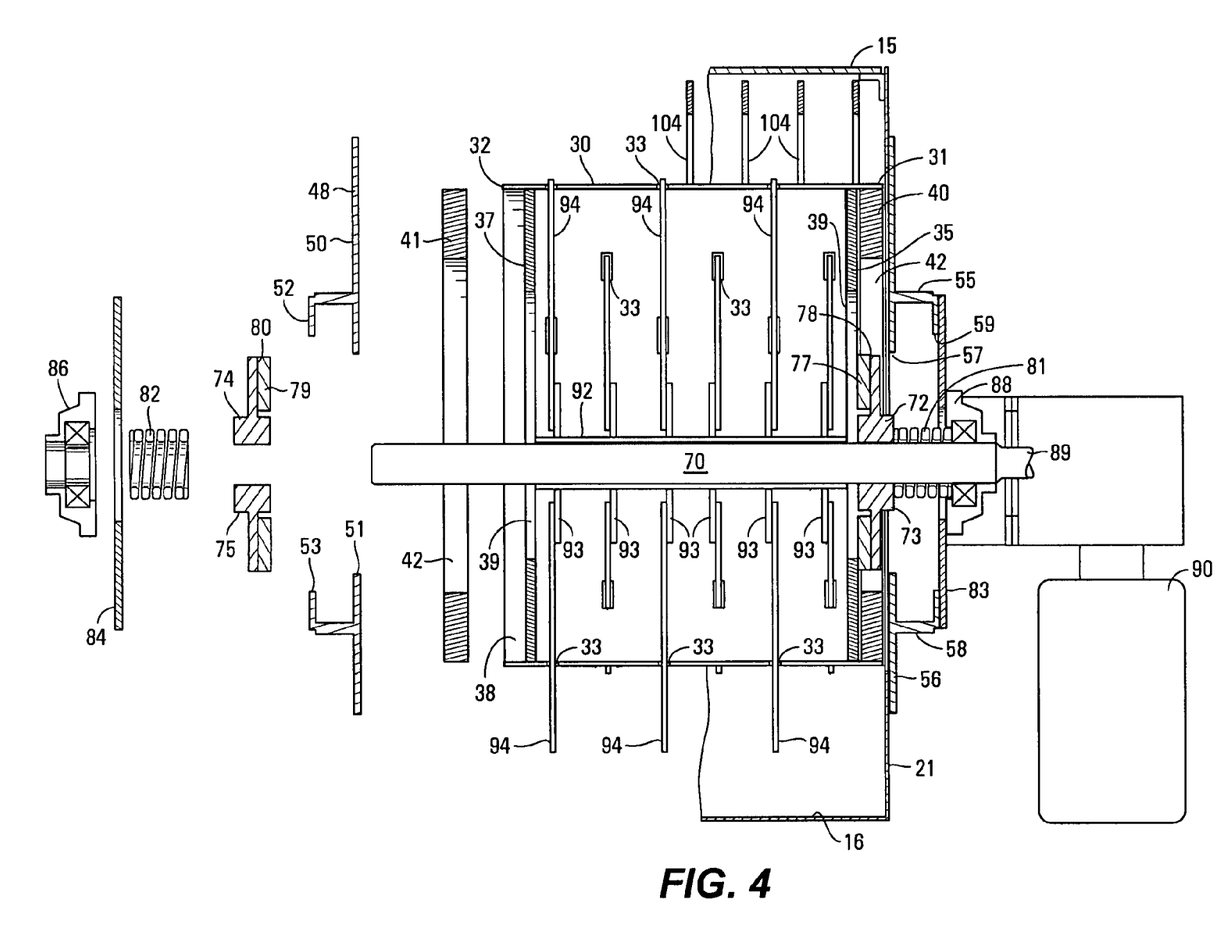
FIG. 4 shows a partially exploded view of various components of the wet chip pick-up assembly shown in FIG. 3.
Figure 5:
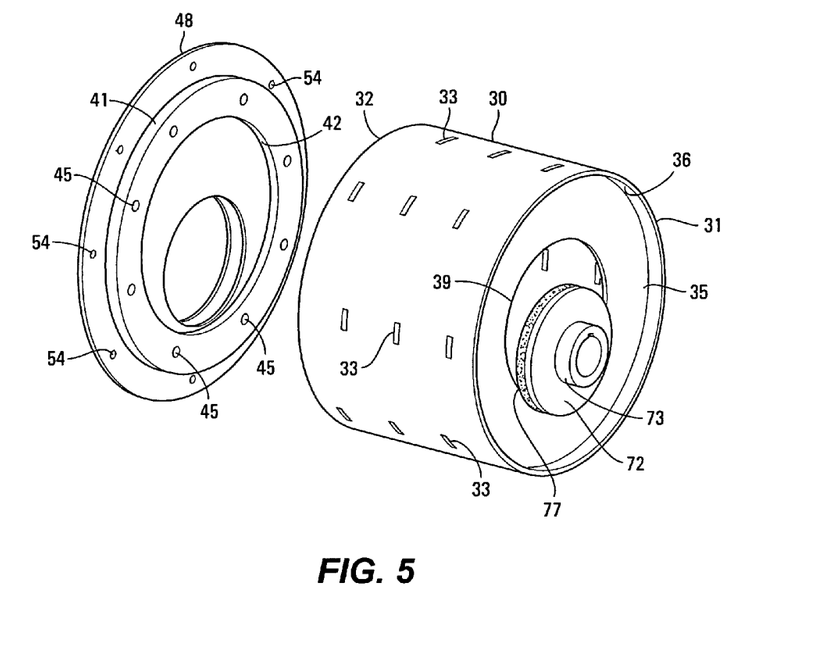
FIG. 5 shows a perspective view of the slotted drum, one of the friction disc assemblies and one of the suspension rings upon which the drum is mounted.
Figure 6:
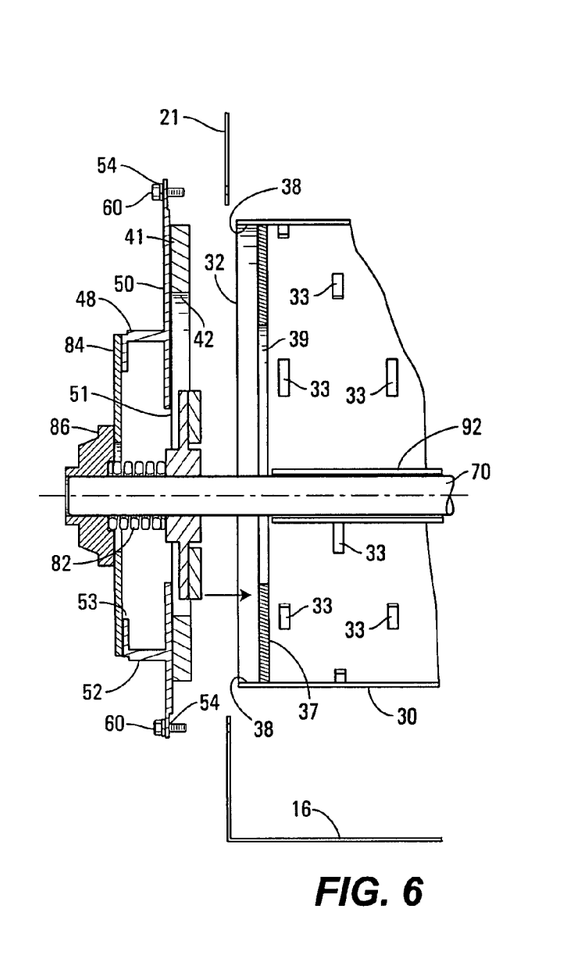
FIG. 6 shows a partial section view of the friction disc assembly spaced from one end of the slotted drum.
Figure 7:
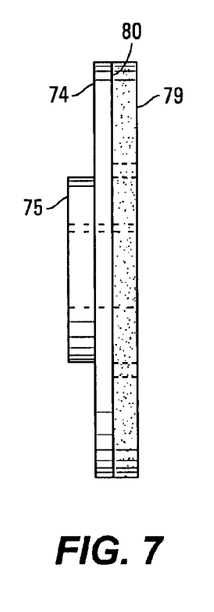
FIG. 7 shows a side view of the friction disc assembly.

A cylindrically-shaped drum 30 is shown, for example, in FIGS. 1, 4 and 5. Drum 30 has a first end 31 and a second spaced end 32. Drum 30 also includes a plurality of slots 33 spaced both radially and longitudinally from one another.

A first drum plate 35 (FIGS. 4,5) is fixedly disposed within drum 30 inwardly from drum end 31 to form a first drum recess 36. A second drum plate 37 is fixedly disposed within drum 30 inwardly from drum end 32 to form a second drum recess 38. Each drum plate 35, 37 has an opening 39.

Two suspension rings 40, 41, each having an opening 42, are utilized to support drum 30 relative to frame assembly 14. Each suspension ring is formed of an ultra high molecular weight (UHMW) material and is positioned, upon assembly, within drum recesses 36, 38 as illustrated, for example, in FIG. 4. Accordingly, drum 30 is adapted to seat on the spaced suspension rings 40, 41 at the location of drum recesses 36, 38.

Each suspension ring 40, 41 has a plurality of spaced fastener openings 45 shown, for example, in FIG. 5. A first access cover 48 (FIGS. 4, 5) comprises a base plate 50 having opening 51 and a raised access member 52 having an opening 53 therein. Base plate 50 includes a plurality of first and second spaced fastener openings, only one set of spaced fastener openings 54 being illustrated in FIGS. 5 and 6. A second access cover 55 comprises a base plate 56 having opening 57 and a raised access member 58 having an opening 59 therein. Base plate 56, like base plate 50, also includes a plurality of first and second spaced fastener openings, not shown.

Suspension ring 41 is fastened by conventional fasteners (e.g., bolts) to base plate 50 at the location of fastener openings 45 (FIG. 5). Base plate 50, in turn, is fastened to a frame side wall 21 at the location of openings 54 by conventional fasteners 60. Similarly, suspension ring 40 is fastened by conventional fasteners to base plate 55 and base plate 55 is, in turn, fastened by conventional fasteners to the remaining side wall 21. Accordingly, each drum end 31, 32 is seated on a UHMW suspension ring 40, 41 with the spaced suspension rings 40, 41 being connected to the frame side walls 21 via an access cover 48, 55.

Drive shaft 70 having a longitudinal axis extends through both the openings 39 in drum plates 35, 37 and the openings 42 in the suspension rings 40, 41. As illustrated more clearly in FIG. 1, the longitudinal axis of drive shaft 70 is offset from the longitudinal axis of rotary drum 30.

A first flanged drive rotor 72 having flange 73 is slidably seated on shaft 70 and positioned contiguous to drum plate 35. A second flanged drive rotor 74 having flange 75 is slidably seated on shaft 70 and positioned contiguous to drum plate 37.

Friction disc 77 is attached to face 78 of rotor 72, and friction disc 79 is attached to face 80 of rotor 74. Discs 77, 79 can be attached to the rotor faces 78, 80 by any suitable removable fastener means, such as spaced, countersunk threaded bolts, which allow the discs 77, 79 to be replaced as needed. Friction disc 77 is normally positioned to contact drum plate 35, while friction disc 79 is normally positioned to contact drum plate 37. A first compression spring 81 is positioned on shaft 70 and abuts flange 73 of drive rotor 72. A second compression spring 82 is positioned on drive shaft 70 and abuts flange 75 of drive rotor 74. The compression springs 81, 82 serve to bias friction discs 77, 79 against drum plates 35, 37.

Access plate 83 is bolted or otherwise removably fastened to access cover member 55, and access plate 84 is similarly removably fastened to access cover 48.

One end of drive shaft 70 is seated in bearing assembly 86, which is removably fastened by conventional fasteners (e.g., bolts) to access plate 84. The opposite end of shaft 70 is positioned in bearing assembly 88 with a reduced portion 89 of shaft 70 extending outward from bearing assembly 88 (FIG. 4). Bearing assembly 88 is removably fastened by conventional fasteners (e.g., bolts) to access plate 83. Motor assembly 90 connects to shaft 70 at 89 such that, upon actuation of motor assembly 90, drive shaft 70 will rotate.

A floating tubular collar 92 seats on drive shaft 70, but is not fixed to the drive shaft 70. A plurality of spaced comb member mounting plates 93 are each fixed, for example, by welding, to collar 92. As seen more clearly in FIG. 1, a plurality of spaced elongated comb members 94 are removably attached by fasteners, such as bolts 95, to each mounting plate 93. Each comb member 94 extends through a drum slot 33 as illustrated, for example, in FIGS. 1–4.

Referring again to FIGS. 1 and 2, a plurality of arcuately-shaped first guide members 104 are spaced between adjacent rows of comb members 94. Each first guide member 104 includes a plurality of spaced bosses 105, each boss 105 having an opening therein. A rod 106 extends through each boss opening, and spacer members 107, seated on rods 106, serve to space adjacent guide members 104 from one another. Rods 106 are fastened to frame side walls 21 by removable fasteners, such as bolts 108.

Figure 2:
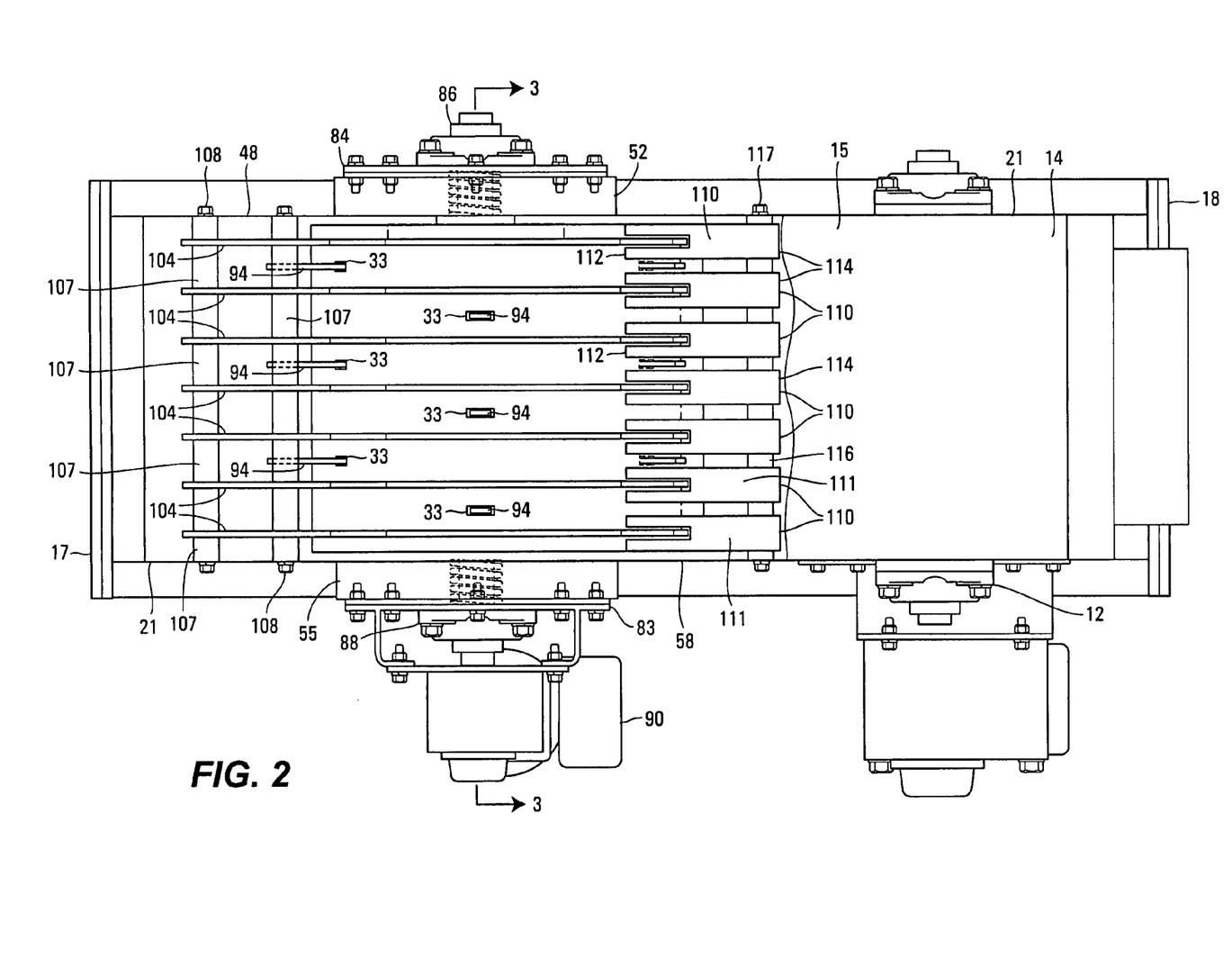
FIG. 2 shows a plan view of the wet chip pick-up assembly of FIG. 1.
Figure 3:
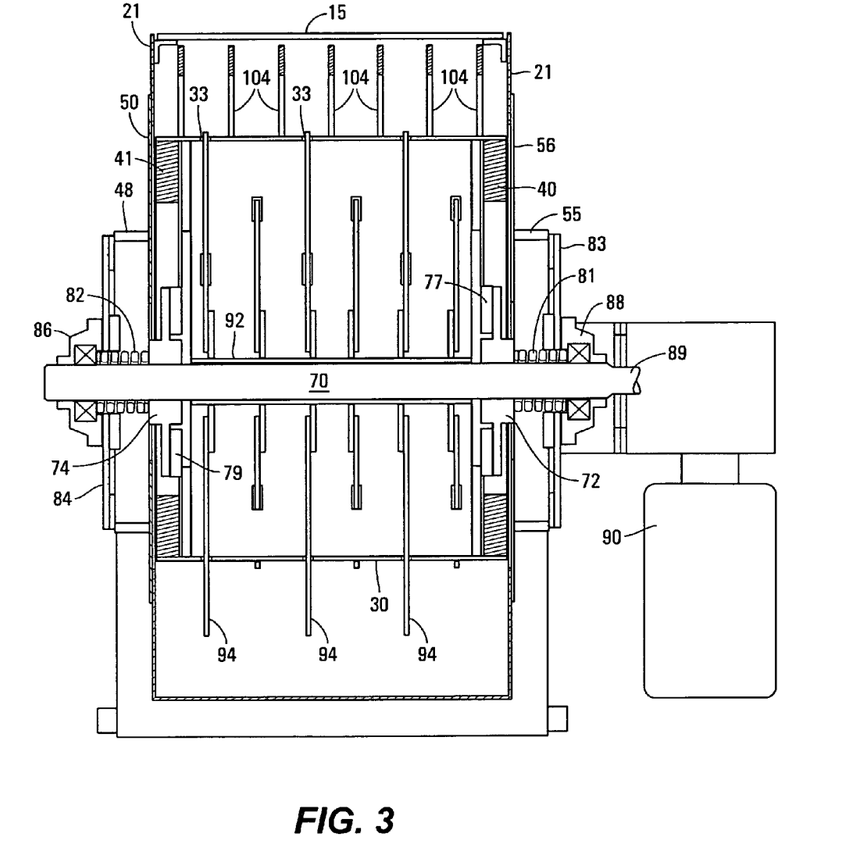
FIG. 3 shows a section view of the wet chip pick-up assembly taken along lines 3—3 in FIG. 2.

A second set of spaced wet chip guide members 110 are also seen in FIGS. 1 and 2. Second guide members 110 each include guide rail 111 slotted at one end 112 (FIG. 2). As illustrated in FIG. 2, first guide members 104 are seated in the slots of guide rails 111. A boss 113 having an opening extends from the remaining end 114 of guide rail 111. A rod 115 extends through the openings in guide bosses 113. Spacers 116 seated on rod 115 serve to space the guide rails 111. Removable fasteners, such as bolt 117, fasten each end of rod 115 to frame side walls 21.

Upon actuation of motor assembly 90, drive shaft 70 will rotate causing friction discs 77, 79 to rotate. As discs 77, 79 rotate, they frictionally engage portions of drum end plates 35, 37 (FIGS. 5, 6) thereby causing slotted drum 30 to rotate. As drum 30 rotates, comb members 94, which are located in drum slots 33 will then rotate. Accordingly, rotation of drum 30 causes the rotation of spaced comb members 94.

In operation, wet chip pick-up assembly 10 and shredder assembly 12, which are disposed in frame assembly 14, either are placed in a flume trough or form part of the trough assembly. Fluid and wet chip material traveling in the direction of arrow F (FIG. 1) are directed to wet chip pick-up assembly 10. Actuation of motor assembly 90 causes slotted drum 30 to rotate which, in turn, rotates combs members 94.

As illustrated in FIG. 1, due to the offset of the longitudinal axes of drive shaft 70 and drum 30, comb members 94 project substantially outwardly from the drum while they are located in the flume trough. Comb members 94, which travel in the direction of arrow A (FIG. 1), engage and lift wet chip material upwardly out of the flume between drum 30 and guide members 104.

As the wet chip material travels upwardly, comb members 94, during the course of a 360° rotation, are drawn inwardly relative to drum 30. As the wet chip material reaches the top of assembly 10, some wet chip material seats on rotating drum 30. As drum 30 continues to rotate, the wet chip material falls off the drum onto inclined guide members 110 following which the wet chip material falls by gravity into shredder assembly 12. Following a shredding operation, the wet chips, reduced in size, reenter the wet chip transport system, whereupon the wet chips normally travel to a centrifugal separation station. There, the wet chips are centrifugally separated into dry chips, which are forwarded to a dry chip collection station, and fluid, which is being recovered either for further use or for disposal.

Figure 8:
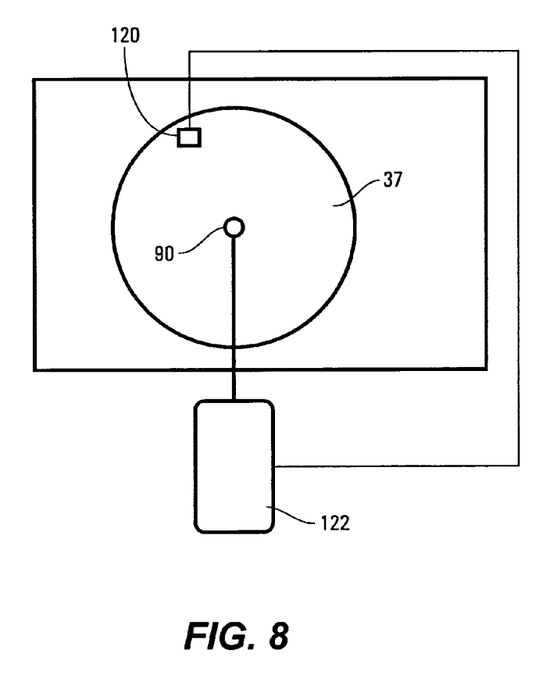
FIG. 8 shows a schematic view of a controller for actuating the friction disc drive assembly.

If, during the course of a wet chip pick-up operation, wet chip material is precluded from being lifted because of, for example, an obstruction in the flume, a sensor 120 (FIG. 8) will sense an increased heat build-up at the location of the drum plates 35, 37. A signal will be sent to motor controller 122 to stop the forward motion of the motor assembly 90 in the direction of arrow A (FIG. 1). Controller 122 will signal motor assembly 90 to reverse, causing the shaft 70 and comb members 94 to travel in a direction opposite to the direction of arrow A for a short period of time, whereupon the obstruction will drop out of the system. Thereafter, following a desired dwell period, controller 122 will signal motor assembly 90 to resume its normal rotation. In the event that the obstruction remains, controller 122 will signal the motor assembly 90 to stop again so that the obstruction can be manually removed. Motor assembly 90 will then be actuated to resume the wet chip pick-up operation. While reference has been made utilizing a heat sensor, it is appreciated that a motion sensor which detects the slow-down or cessation of motion also could be employed, if desired, by a person of ordinary skill in the art.

While two friction disc assemblies have been illustrated for rotating the slotted drum 30, it is appreciated that, in some instances, only one friction drive assembly may be required.

The foregoing detailed description is given for clearness of understanding only, and no unnecessary limitations should be understood therefrom, as modification within the scope of the invention will be apparent to those skilled in the art.

What is claimed is:

1. A wet chip pick-up assembly comprising:
   a cylindrically-shaped drum having a first end, a second end and a plurality of spaced slots;
   a drive assembly including a rotatable drive shaft extending through said drum and at least one friction disc assembly fastened to said drive shaft for rotation with said drive shaft,
   said at least one friction disc assembly being frictionally enagagable with said drum at one of said drum ends;
   a collar seated on said shaft and rotatable relative to said shaft; and
   a plurality of comb member assemblies attached to said collar, said comb member assemblies each including a comb member disposed in one of said drum slots, said comb member extending outward from said one of said drum slots for at least a portion of a drum rotation when said drum is rotated.

2. The wet chip pick-up assembly of claim 1, further comprising:
   a frame having a pair of spaced first and second side walls;
   said drum having a first plate located contiguous to said first drum end and a second plate located contiguous to said second drum end;
   said at least one friction disc assembly disposed on said drive shaft and adapted to engage said first drum plate;
   a second friction disc assembly disposed on said drive shaft and adapted to engage said second drum plate; and
   a motor assembly connected to said drive shaft to rotate said drive shaft whereupon said first friction disc assembly frictionally engages said first drum plate and said second friction disc assembly frictionally engages said second drum plate to cause said drum to rotate thereby causing said comb members located in said drum slots to rotate.

3. The wet chip pick-up assembly of claim 2, further comprising:
   a first suspension ring and a second suspension ring,
   each of said suspension rings being indirectly connected to one of said spaced side walls, and said drum being suspended on said suspension rings contiguous to the first and second drum ends.

4. The wet chip pick-up assembly of claim 3, wherein said suspension rings are formed from an ultra high molecular weight material.

5. The wet chip pick-up assembly of claim 2, wherein said friction disc assemblies each comprise a rotor and a friction disc attached to said rotor.

6. The wet chip pick-up assembly of claim 1, wherein said at least one friction disc assembly comprises a rotor and a friction disc attached to said rotor.

7. The wet chip pick-up assembly of claim 1, further comprising a guide assembly comprising arcuately-shaped guide members for guiding the movement of wet chip material relative to said drum.

8. The wet chip pick-up assembly of claim 7, further comprising a second guide assembly for guiding wet chip material away from said drum.

9. The wet chip pick-up assembly of claim 1, further comprising a motor assembly connected to said drive shaft to rotate said drive shaft.

10. A wet chip pick-up assembly comprising:
    a frame having a pair of spaced side walls;
    a rotatable drive shaft;
    a tubular collar disposed to seat on and rotate relative to said drive shaft;
    a cylindrically-shaped drum having two spaced ends and having a plurality of spaced slots therein;
    a plurality of comb member assemblies attached to said collar, said comb member assemblies each including a plurality of spaced comb members, said comb members each being adapted to extend through one of the plurality of slots in said drum;
    at least one friction disc assembly disposed on said drive shaft;
    at least one drum plate located contiguous to one of said drum ends,
    said at least one friction disc assembly being frictionally engageable with said at least one drum plate; and
    a motor assembly for rotating said drive shaft,
    whereupon actuation of said motor assembly causes said at least one friction disc assembly to engage said at least one drum plate causing said drum to rotate which, in turn, rotates said comb members.

11. The wet chip pick-up assembly of claim 10, further comprising a spring assembly seated on said drive shaft and adapted to engage and compress said at least one friction disc assembly against said at least one drum plate.

12. The wet chip pick-up assembly of claim 10, wherein said at least one friction disc assembly comprises a rotor and a friction disc attached to said rotor.

13. The wet chip pick-up assembly of claim 10, further comprising a spring assembly seated on said drive shaft and adapted to engage and compress said at least one friction disc assembly against said at least one drum plate.

14. The wet chip pick-up assembly of claim 10, further comprising a guide assembly comprising arcuately-shaped guide members for guiding the movement of wet chip material relative to said drum.

15. The wet chip pick-up assembly of claim 14, further comprising a second guide assembly for guiding wet chip material away from said drum.

16. A wet chip pick-up assembly comprising:
a cylindrically-shaped drum having a longitudinal axis, a first end, a second end and a plurality of spaced slots;
a first drum plate joined to said drum at the location of said first drum end and a second drum plate joined to said drum at the location of said second drum end, said first and second drum plates each having an opening therein;
a drive shaft extending through said drum plate openings, said drive shaft having a longitudinal axis, the longitudinal axis of said drive shaft being offset from the longitudinal axis of said drum;
a first friction disc assembly disposed on said drive shaft and frictionally engageable with said first drum plate;
a second friction disc assembly disposed on said drive shaft and frictionally engageable with said second drum plate;
a motor assembly for rotating said drive shaft;
a collar disposed on said drive shaft between said first and second drum plates; and
a plurality of spaced comb member assemblies connected to said collar, said comb member assemblies each including a plurality of spaced comb members, each comb member being adapted to seat in one of the plurality of drum slots,
whereupon actuation of said motor assembly causes said drive shaft to rotate whereupon said friction disc assemblies frictionally engage said drum plates whereupon said drum rotates causing said comb members seated in said drum slots to rotate.

17. The wet chip pick-up assembly of claim 16, wherein each of said friction disc assemblies comprises a rotor and a friction disc attached to said rotor.

18. The wet chip pick-up assembly of claim 16, further comprising:
a first compression spring seated on said drive shaft and adapted to compress said first friction disc assembly against said first drum plate; and
a second compression spring seated on said drive shaft and adapted to compress said second friction disc assembly against said second drum plate.

19. The wet chip pick-up assembly of claim 16, further comprising a guide assembly comprising arcuately-shaped guide members for guiding the movement of wet chip material relative to said drum.

20. The wet chip pick-up assembly of claim 19, further comprising a second guide assembly for guiding wet chip material away from said drum.

* * * * *

UNITED STATES PATENT AND TRADEMARK OFFICE
CERTIFICATE OF CORRECTION

| | |
|---|---|
| PATENT NO. | : 7,021,455 B2 |
| APPLICATION NO. | : 10/823943 |
| DATED | : April 4, 2006 |
| INVENTOR(S) | : William D. Nemedi |

It is certified that error appears in the above-identified patent and that said Letters Patent is hereby corrected as shown below:

In the Claims:

At Column 5, line 57, "enagagable" should be -- engageable --,

At Column 7, line 8, "claim 10" should be -- claim 12 --.

Signed and Sealed this

Eighteenth Day of March, 2008

JON W. DUDAS
*Director of the United States Patent and Trademark Office*